US009835642B2

(12) United States Patent
Smith et al.

(10) Patent No.: US 9,835,642 B2
(45) Date of Patent: Dec. 5, 2017

(54) HIGH SPEED IMAGE PROCESSING DEVICE

(71) Applicant: The Johns Hopkins University, Baltimore, MD (US)

(72) Inventors: Samuel M. Smith, Lindon, UT (US); Charbel G. Rizk, Sykesville, MD (US)

(73) Assignee: The Johns Hopkins University, Baltimore, MD (US)

( * ) Notice: Subject to any disclaimer, the term of this patent is extended or adjusted under 35 U.S.C. 154(b) by 251 days.

(21) Appl. No.: 14/534,434

(22) Filed: Nov. 6, 2014

(65) Prior Publication Data
US 2015/0129745 A1 May 14, 2015

Related U.S. Application Data

(60) Provisional application No. 61/901,531, filed on Nov. 8, 2013.

(51) Int. Cl.
| G01P 3/38 | (2006.01) |
| G01S 17/58 | (2006.01) |
| G01S 17/89 | (2006.01) |
| G01S 7/486 | (2006.01) |
| G01J 1/42 | (2006.01) |

(52) U.S. Cl.
CPC .............. *G01P 3/38* (2013.01); *G01J 1/4228* (2013.01); *G01S 7/4863* (2013.01); *G01S 17/58* (2013.01); *G01S 17/89* (2013.01)

(58) Field of Classification Search
CPC .......... G01J 1/4228; G01P 3/38; G01S 17/58; G01S 17/89; G01S 7/4863
See application file for complete search history.

(56) References Cited

U.S. PATENT DOCUMENTS

| 5,812,269 A | 9/1998 | Svetkoff et al. |
| 7,523,863 B2 | 4/2009 | Tsikos et al. |
| 8,421,015 B1 | 4/2013 | Scott et al. |
| 8,692,176 B2 | 4/2014 | Kelly et al. |
| 8,749,396 B2 | 6/2014 | Maggiore |
| 2001/0015763 A1* | 8/2001 | Miwa ....................... G02B 7/28 |
| | | 348/345 |
| 2003/0088361 A1* | 5/2003 | Sekiguchi ............... G01S 11/12 |
| | | 701/301 |

(Continued)

*Primary Examiner* — Francis M Legasse, Jr.
(74) *Attorney, Agent, or Firm* — Noah J. Hayward

(57) ABSTRACT

A scene measurement assembly includes a first illuminator assembly having multiple grids of coplanar illuminators, a first system-on-chip light sensing device having sensors disposed to receive reflected light emitted by the first illuminator assembly, a second illuminator assembly having plural grids of coplanar illuminators, each of the plural grids of coplanar illuminators being disposed in different planes relative to each other, and a second system-on-chip light sensing device that receives reflected light emitted by the second illuminator assembly. Each of the multiple grids of coplanar illuminators of both illuminator assemblies is disposed in different planes relative to each other. The first and second system-on-chip light sensing devices each have a sampling rate of greater than 10,000 frames per second relative to performing on-chip image data processing. The system-on-chip light sensing devices are each disposed at a scene to be measured at locations having different perspectives of the scene.

19 Claims, 4 Drawing Sheets

(56) References Cited

U.S. PATENT DOCUMENTS

| | | | |
|---|---|---|---|
| 2005/0231734 A1* | 10/2005 | Johannesson | G01B 11/046 356/601 |
| 2007/0268398 A1* | 11/2007 | Raskar | G01S 17/023 348/370 |
| 2010/0059589 A1* | 3/2010 | Goncalves | G06K 9/00771 235/383 |
| 2012/0120413 A1 | 5/2012 | Bellis et al. | |
| 2013/0112848 A1 | 5/2013 | Lin et al. | |
| 2013/0250278 A1* | 9/2013 | Zhao | G01B 11/162 356/35.5 |
| 2013/0335531 A1 | 12/2013 | Lee et al. | |

* cited by examiner

HIGH SPEED IMAGE PROCESSING DEVICE

CROSS-REFERENCE TO RELATED APPLICATIONS

This application claims the benefit of U.S. Provisional Application No. 61/901,531 filed on Nov. 8, 2013, the entire contents of which are hereby incorporated herein by reference.

TECHNICAL FIELD

Exemplary embodiments of the present disclosure generally relate to optical sensing technology, and more specifically relate to a system for providing imaging sensor arrays capable of acting as highly accurate sensory structures with expanded uses.

BACKGROUND

A sensing array is an array of sensing elements at or near a surface of transducing elements. One type of sensing array is a focal plane array (FPA), which has sensing elements arranged at a focal plane of a lens or mirror. Sensing arrays can be used in imaging, for example, with light sensors in visible, infra-red and ultraviolet imaging, with electrochemical sensing arrays such as mechanical field sensing or terahertz imaging. Properly biased sensors each typically convert a sensing quantity into a voltage, current, charge or resistance related to the physical quantity incident on the sensor. Charge coupled devices (CCD) are often used for visible imagers. Infrared (IR) imaging often makes use of infrared sensors and a separate chip called a readout integrated circuit (ROIC), which are bonded together in an assembly as a focal plane array. Sensing arrays such as focal plane arrays or readout integrated circuits may have sensors integrated with circuitry in a system-on-chip. A Computational Sensing Array (CSA) is an array of computational structures at, near or including a sensing array (SA).

Responses of individual elements in the sensing array can exhibit variability as a result of differences in the sensors in a specific array. Variability includes, but is not limited to sensors having different zero-signal levels and/or different gains. Variability that is time-varying manifests itself as temporal or spatial noise. Stationary spatial variability/noise is often called non-uniformity. This can be corrected across the array of pixels by applying a variability correction. Time-dependent variability can also be introduced in the process of quantizing the continuous time, continuous value signal to yield a continuous or discrete time discrete value signal. Generally, a correction process is applied using a processor and software, for example a digital signal processor (DSP), as a postprocessing operation after the individual sensing elements have been read out to a memory external to the sensing array. Applying variability correction, for example non-uniformity correction (NUC), as a postprocessing operation using a processor and software is common practice in sensor arrays, including imaging arrays that are scanned such as CMOS or CCD imagers. Doing the latter is energy inefficient and resources inefficient and cannot always be performed, especially in event-based sensor arrays where response is necessary at time scales beyond those involved with software-based NUC correction.

To address some of these drawbacks, solutions have been sought in the area of high speed imaging sensors. The provision of high speed imaging sensors may unlock or otherwise enable a number of applications and use cases of interest.

BRIEF SUMMARY OF SOME EXAMPLES

Some example embodiments may enable the provision of a high speed imaging system capable of providing true three dimensional (3D) scene measurement, highly accurate boundary violation detection, and/or highly accurate speed measurement. Some example embodiments may employ a flexible readout and integrated sensor (FRIS) that may have exceptional performance with limited physical size, weight and energy resources. Various unique structured lighting applications or arrangements may therefore be enabled.

In one example embodiment, a scene measurement assembly is provided. The scene measurement assembly may include a first illuminator assembly comprising multiple grids of coplanar illuminators, a first system-on-chip light sensing device comprising sensors disposed to receive reflected light emitted by the first illuminator assembly, a second illuminator assembly comprising plural grids of coplanar illuminators, each of the plural grids of coplanar illuminators being disposed in different planes relative to each other, and a second system-on-chip light sensing device disposed to receive reflected light emitted by the second illuminator assembly. Each of the multiple grids of coplanar illuminators of both of the first and second illuminator assemblies is disposed in different planes relative to each other. The first and second system-on-chip light sensing devices each have a sampling rate of greater than 10,000 frames per second relative to performing on-chip image data processing. The first and second system-on-chip light sensing devices are each disposed at a scene to be measured at locations having different perspectives of the scene.

In another example embodiment, a boundary monitoring system is provided. The boundary monitoring system may include an illuminator assembly configured to generate a structured light boundary, and a system-on-chip light sensing device including sensors disposed to receive reflected light emitted by the illuminator assembly and reflected off an object in the structured light boundary. The system-on-chip light sensing device may have a sampling rate of greater than 10,000 frames per second relative to performing on-chip image data processing.

In still another example embodiment, high speed image processing device is provided. The high speed image processing device may include an illuminator assembly configured to generate a structured light pattern, and a system-on-chip light sensing device having sensors disposed to receive reflected light emitted by the illuminator assembly. The system-on-chip light sensing device may be configured to process changes in the structured light pattern indicated in the reflected light in subsequent image frames to determine speed measurements based on optical flow. The system-on-chip light sensing device may have a sampling rate of greater than 10,000 frames per second relative to performing on-chip image data processing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
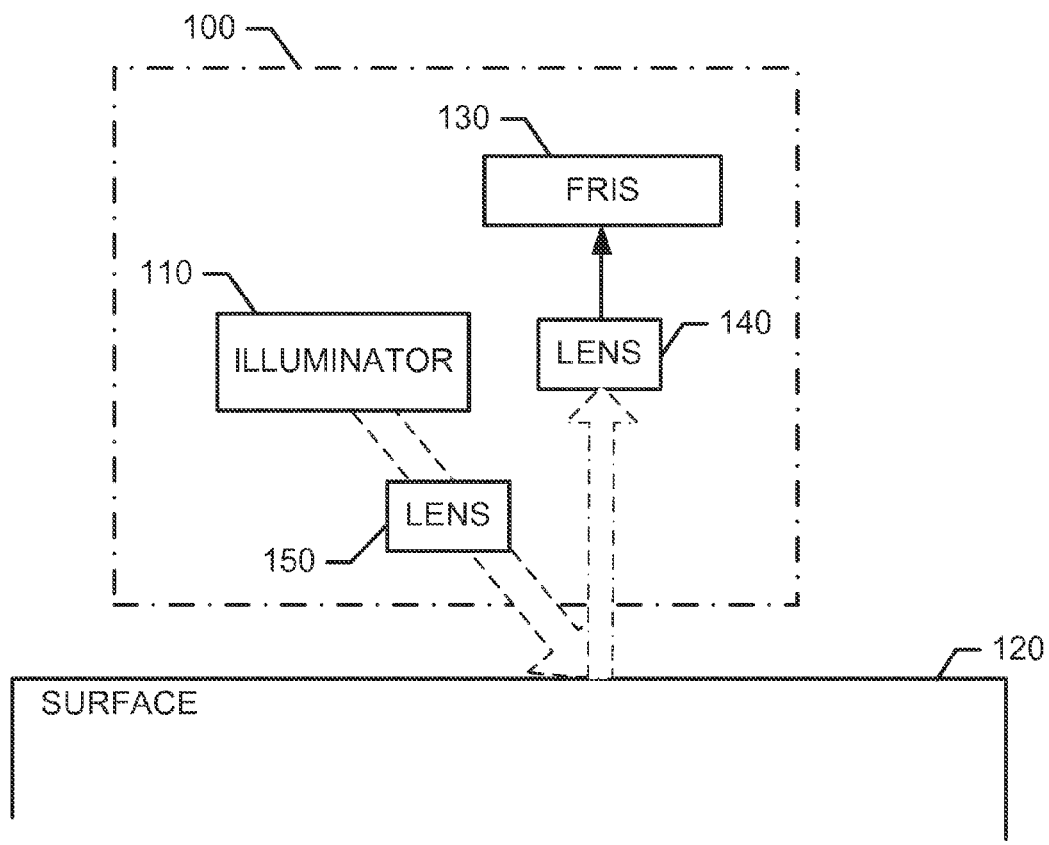
FIG. 1 illustrates a block diagram showing components of a speed measurement system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As mentioned above, some example embodiments of a sensing array configured for high speed imaging may be employed in the context of unique structured lighting applications. Such a sensing array may be referred to herein as a flexible readout and integrated sensor (FRIS) or FRIS sensor. Co-pending U.S. application having Ser. No. 13/671,146, which is incorporated herein by reference in its entirety, describes a computational sensing array (CSA), which is an example of the FRIS sensor described herein. However, the FRIS sensor should generally be appreciated as an example of an image processor that combines multiple functions associated with image processing on-chip. In this regard, the FRIS sensor of example embodiments may combine high speed sampling and on-chip signal conditioning among other things. For example, the FRIS may be an example of a system-on-chip light sensing device that embeds the signal collection, digital conversion, conditioning, local gain control, processing for information extraction, and auto-detection with asynchronous event-based (selective) or on-demand sampling (readout). As such, a FRIS may generally be an example of a system on-chip image processor as described and claimed herein. In some cases, the FRIS sensor may be capable of acting as a distance measuring sensor that is configured to measure intensity and/or time of flight for a pulse of light transmitted to make range determinations. The FRIS sensor of example embodiments may be capable of operating as a high sampling rate imager configured to process greater than 1000frames per second, and in some cases greater than about 10,000 to 50,000 frames per second on-chip. The sampling rate may be selective based on the application for which the FRIS is used, and thus it need not be a fixed number in some cases. In some cases, the FRIS may only process pixels that change so that it performs high speed sampling with selective readout. Furthermore, in some cases, the array size of the imager may be greater than 100 by 100. Although not required, the FRIS may also be enabled to do some filtering on-chip. However, other examples may employ external components for any desired filtering. In any case, the FRIS may provide a capability for handling image data having a large number of pixels to compare changes in subsequent frames at very high speeds.

FIG. 1 illustrates a block diagram showing components of a system to facilitate speed measurement in accordance with an example embodiment. In this regard, as shown in FIG. 1, a speed measurement device 100 may be provided with an illuminator 110 provided to direct light incident upon a surface 120. Reflections off the surface 120 may ultimately be detected at the FRIS 130, in some cases after passing through a lens 140. The illuminator 110 may be one or multiple instances of a laser, an LED or other light source in the visible, infra-red or ultraviolet ranges. In some cases, the illuminator 110 may include or be provided in combination with a lens 150. In some embodiments, the illuminator 110 may be configured to modulate light emissions. Thus, for example, coded laser lighting emissions may be projected for detection by the FRIS 130 to avoid interference. The lens 150 may collimate light exiting the illuminator 110 onto the surface 120, and the lens 140 may focus reflected light at sensors of the FRIS 130.

In this configuration, the speed measurement device 100 may employ digital image correlation to operate similar to an optical mouse. In this regard, for example, the FRIS 130 may be configured to capture sequential images of the surface 120 and compare such images to each other to determine movement of the structure in or onto which the FRIS 130 is mounted relative to the surface 120. As such, for example, the FRIS 130 performs speed measurements by optical flow relative to the reflections. In particular, the reflections from the illuminator 110 are detected at the FRIS 130 to form a pattern and changes in the pattern are detected and compared at a high rate so that the offset of the pixels in subsequent frames can be used to detect velocity of movement of the speed measurement device 100. Thus, the image chip on the FRIS 130 is essentially configured to compare sequentially detected textures to each other to determine velocity based on changes in patterns or textures in sequential image frames.

However, because the FRIS 130 is configured to perform on-chip processing of 10,000 to 50,000 frames per second, the high sampling rate capability enables the FRIS 130 to detect and filter out moving backgrounds. As such, the FRIS 130 may be configured to act as an optical correlation velocity log for speed measurements of optical flow of the illuminator 110. However, unlike an optical mouse, which operates in very close proximity to the surface over which it detects reflections and at relatively low speeds, the FRIS 130 may be operable at both higher speeds than the optical mouse and greater distances. The FRIS 130 may be configured to calculate not just speed, but also distance by determining a speed at each measured time and corresponding location.

The structured illumination provided in the context of this example embodiment may be interleaved, swept or otherwise resonantly projected from the illuminator 110 to provide different optical flow characteristics. These different optical flow characteristics may allow the FRIS 130 to employ sampling to filter out moving background objects. Accordingly, the FRIS 130 may be configured to provide precise filtering out of objects moving at different speeds. In the frequency domain, injecting structured lighting with different spatial frequencies may enable the extraction of background information that correlates at those frequencies.

The FRIS 130 of an example embodiment therefore acts as a high speed imager that does not alias and can see small changes. As an example, the ability to filter out moving background objects may allow the FRIS 130 to operate to provide accurate depth measurements over unstable or changing surfaces, since surface features can be filtered out. If, for example, the FRIS 130 is employed in the context of a depth detector that operates over a surface covered in sea grass, the sea grass may be expected to waver or move with currents or waves. While a typical imaging sensor may have difficulty determining location and depth in such an environment due to the continued changing of the surface from which reflections are detected, the FRIS 130 may be enabled to filter out the motion of the sea grass by detecting and filtering out the moving background that the sea grass provides. The result may be an accurate depth and movement determination in an otherwise hostile environment for operation of a sensing array that uses imaging as its basis.

Figure 2:
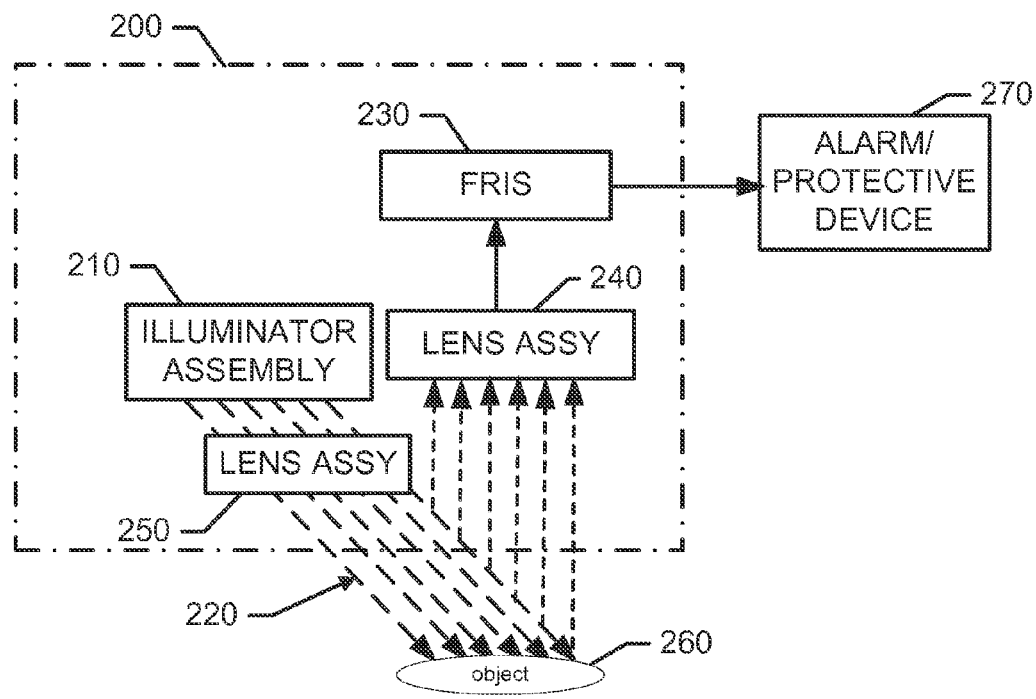
FIG. 2 illustrates a block diagram of a boundary monitoring apparatus in accordance with an example embodiment.

FIG. 2 illustrates a boundary monitoring system 200 in accordance with an example embodiment. The boundary monitoring system 200 may include an illuminator assembly 210 configured to create a structured light boundary 220. The illuminator assembly 210 may include one or multiple instances of a laser, an LED or other light source in the visible, infra-red or ultraviolet ranges. The structured light boundary 220 may be formed as one or more laser lines that are arranged to form a boundary or threshold. The laser lines can be arranged to be coplanar to form a linear boundary or threshold. Similar to the example described above, the illuminator assembly 210 may be configured to modulate light emissions. Thus, for example, coded laser lighting may be projected for detection by the FRIS 230 to avoid interference.

Unlike the example of FIG. 1, in which the speed measurement device 100 is expected to move relative to surface 120, in the example of FIG. 2, the boundary monitoring system 200 may remain fixed in some cases. Thus, the structured light boundary 220 may remain established at the location being monitored and reflected light may be detected at FRIS 230 similar to the example above. In some embodiments, the reflected light may be focused at the FRIS 230 using a lens assembly 240, and another lens assembly 250 may also be used to focus the light from the illuminator assembly 210 to form the structured light boundary 220.

The FRIS 230 in this example continuously monitors for reflected light from the object 260 when the structured light boundary 220 is crossed by employing the high sampling rate of the FRIS 230 (e.g., greater than 10,000 frames per second). If an object 260 should cross the structured light boundary 220, the reflected light would correspondingly be received and the event is detected at the FRIS 230. In other words, the object 260 would occlude the light path back to the FRIS 230. However, since the frame speed of the FRIS 230 is so high, the FRIS 230 is enabled to detect the object 260 with great accuracy. In this regard, for example, precise timing data associated with the detection can be determined even if the object 260 is moving at a very high speed.

The ability to accurately detect even high speed objects moving across a boundary or threshold may have multiple applications and advantages. For example, the ability to employ a high sampling rate detector may allow determinations to be made as to exactly where and when a particular boundary was crossed by a fast moving object. Furthermore, the filtering capabilities of the FRIS 230 may enable the shape of the object 260 to be determined. Thus, for example, in applications where multiple objects may possibly encounter the boundary or threshold, it may be possible to distinguish the particular object that crossed the boundary at any given time when a boundary crossing event occurs.

Although the boundary may be defined using a direct line of sight, as shown in FIG. 2, it should be appreciated that it is not necessary for all embodiments to form the boundary in this manner. Thus, in some cases, boundaries may be extended beyond the direct line of sight using optics such as, for example, mirrors. In such examples, one or more line segments connected by optics (e.g., mirrors) may be provided and object detection may then be accomplished using detectors that do not necessarily have a direct line of sight to the object being detected.

In some embodiments, the boundary monitoring system 200 may be employed to detect sports line violations in an accurate manner. For example, a tennis serve or other tennis strokes can be monitored relative to the boundaries of the tennis court. Baseballs can be monitored relative to boundaries of the ball field. Sidelines and end lines can be monitored in basketball, football, or other sports. Numerous other sporting applications may also be employed. In these examples, one or more boundary monitoring systems and corresponding structured light boundaries may be employed for each boundary to be monitored. Alternatively or additionally, as mentioned above, mirrors may be employed to allow detectors outside the field of play to detect objects outside of their direct line of sight. When the FRIS 230 detects occlusion of the structured light boundary 220 (whether directly or indirectly), the FRIS 230 may generate an output that may trigger an alarm 270.

In some cases, example embodiments of the boundary monitoring system 200 may be employed in the context of security systems. Thus, for example, one or more boundary monitoring systems and corresponding structured light boundaries may be employed to define one or more corresponding security boundaries to be monitored. An area around a high valued object may be monitored in some cases. Additionally or alternatively, doorways, windows or other entry and egress paths may be monitored with corresponding structured light boundaries. Whole rooms or buildings may also be monitored in some cases. When an object is detected by the FRIS 230, the output of the FRIS 230 may again drive an alarm 270. In some cases, in addition to or as an alternative to activation of the alarm 270, a protective device may be triggered. As mentioned above, mirrors may be employed to allow detectors to monitor a boundary that circumscribes a protected area with indirect lines of sight.

In an example embodiment, the boundary monitoring system 200 may be employed in the context of safety systems of various kinds Thus, for example, the boundary monitoring system 200 and the structured light boundary may be employed to define a safety threshold or boundary that, when crossed, may trigger an automatic shutdown or the alarm/protective device 270. When used in this context, the boundary monitoring system 200 may operate in work places where hazardous objects are moved into spaces that could harm workers to detect high speed boundary violations. Thus, the object 260 could be detected to protect people or workers from the object 260 when the object crosses the boundary. However, in some cases, the object 260 itself may be the object of the protection desired. For example, the object 260 could be a high value item or even a living thing or appendage that, when detected at the boundary may cause some dangerous equipment or situation to be stopped.

Figure 3:
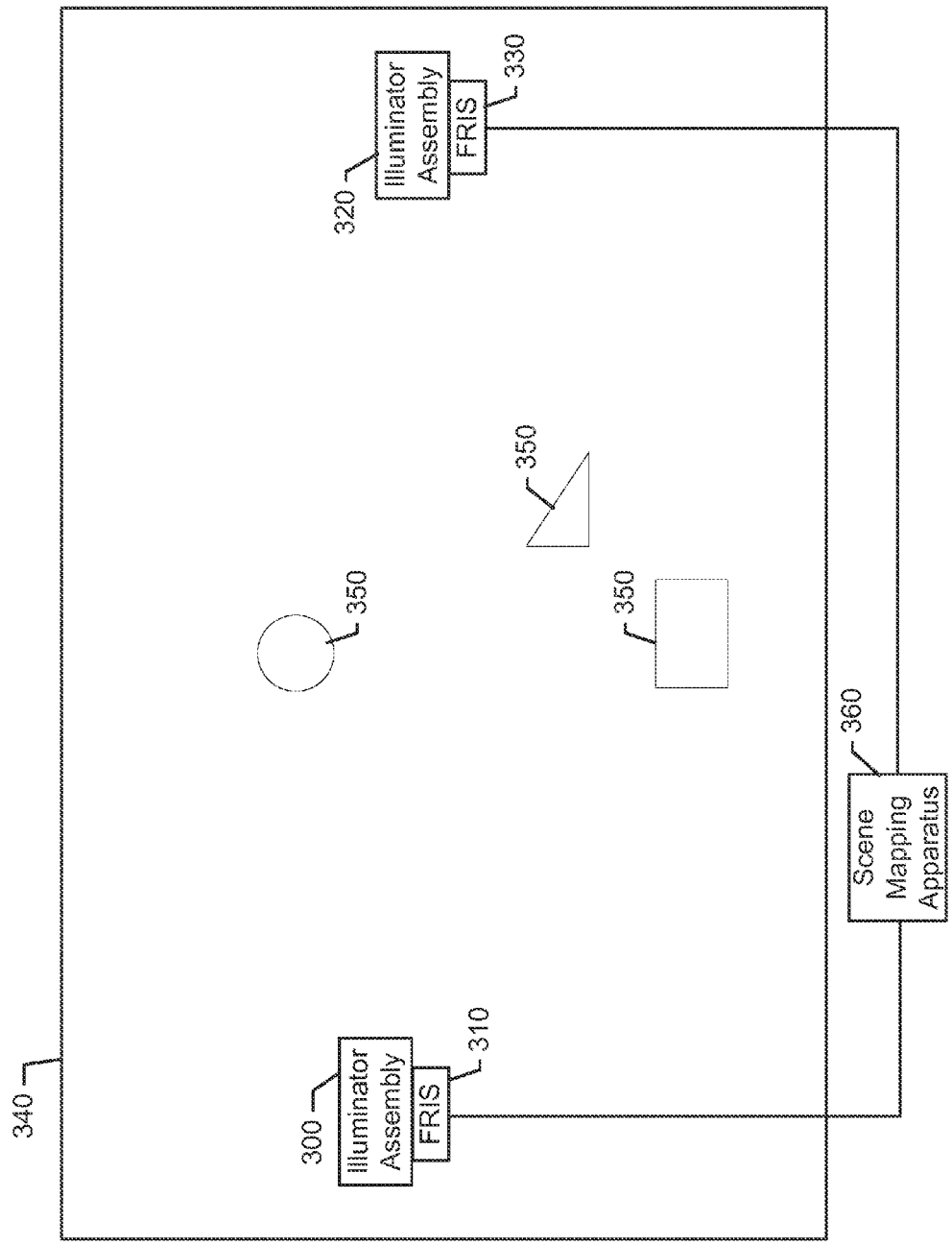
FIG. 3 illustrates a plan view of a system for performing 3D scene measurement in accordance with an example embodiment.

In still other example embodiments, 3D scene measurement may be accomplished using a combination of structure laser light illumination and FRIS sensors on multiple planes (e.g., where each plane includes a grid of coplanar illuminators). In such a use case, frame measurement may be accomplished using multiplexing in order to make sure that interference can be avoided. FIG. 3 illustrates a plan view of a system for performing 3D scene measurement in accordance with an example embodiment.

As shown in FIG. 3, the system may include a first illuminator assembly 300 and a corresponding first FRIS 310. The system may further include a second illuminator assembly 320 and second FRIS 330. In some cases, one or more lenses may also be employed, but such lenses are not necessary. The first illuminator assembly 300 and the first FRIS 310 may be disposed at one portion of the scene area 340 and the second illuminator assembly 320 and the second FRIS 330 may be disposed at a different portion so that different perspectives are offered relative to objects 350 within the scene area 340. Without the benefit of different perspectives, any scene mapping or measurement would only be enabled to provide a mapping or scene measurement of one side of the objects 350. This may be referred to as 2.5D instead of 3D since the reverse side of the objects 350 would remain unmapped or unmeasured. Furthermore, the high sampling rate of the FRISs of example embodiments provides a much higher fidelity capture of any 3D motion that may be observable relative to objects 350 in the scene area 340.

In some embodiments, the illuminator assemblies and FRISs may be time multiplexed or coded so that interference can be avoided. The FRISs may therefore act as distance sensors to measure time of flight for pulses sent out and reflecting off objects 350 and other structures in the scene area 340. When ranges to the various structures encountered are computed, they can be presented to provide a mapping of the scene in two dimensions all around each of the FRISs. By providing coverage in multiple planes, the third dimension is added, and the use of multiple perspectives ensures that the 2.5D mapping described above is not the end result.

Example embodiments employing scene measurement as described in the context of FIG. 3 may be useful in connection with interactive gaming and motion capture for motion pictures. For motion capture, specular reflectors may be employed for high speed, high fidelity tracking for slow motion action sequences. Example embodiments may also be useful in connection with sport performance modeling of athletes. In some cases, embodiments similar to that of FIG. 3 may be used to create a volumetric security system. In such a system, multiple illumination planes may provide a static 3D measurement of a room. Any change to the static 3D nominal image may indicate an intruder in the space. The spacing of the illuminators can be made to be very small inexpensively relative to conventional photocell based systems.

As mentioned above, each of the first and second illuminator assemblies 300 and 320 may include a grid of individual illuminators that may be coplanar with each other, and these planar grids may be repeated in multiple planes. Meanwhile, the first and second FRISs 310 and 330 may also include sensors deployed in the respective different planes to receive reflections from the first and second illuminator assemblies 300 and 320, respectively.

The high sampling rate of the FRIS sensors allows for encoding and multiplexing of the structured illumination so that the plane of the illumination can be disambiguated by multiple FRIS sensors. By post processing range measurements on the different planes, a 3D object measurement can be obtained. High speed imaging sensors such as the FRIS described herein may be employed in cooperation with structured illumination to allow for oversampling of a scene or other area using temporal and spatial regimes that can extract temporal and spatial features not previously attainable with lower speed sensors.

In an example embodiment, a scene mapping apparatus 360 may be provided to perform 3D object measurements as described above. In this regard, for example, the scene mapping apparatus 360 may be configured to receive data from the first and second FRISs 310 and 330 to generate a 3D representation of the scene based on the data.

Figure 4:
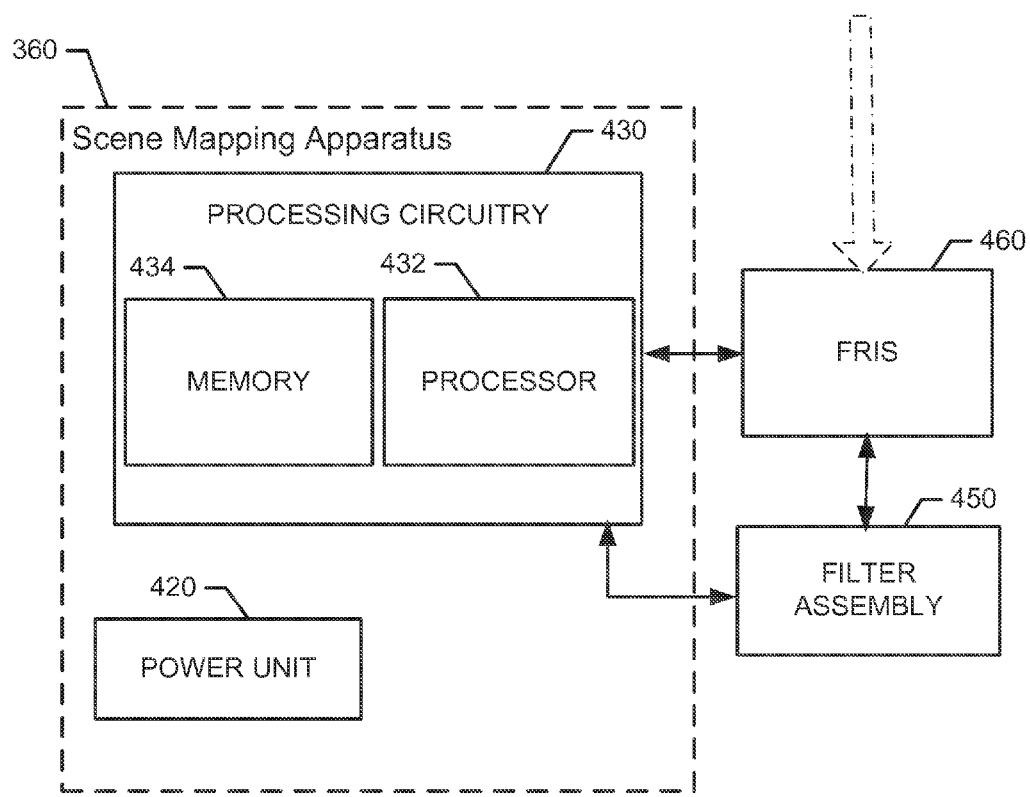
FIG. 4 illustrates a block diagram of some portions of a scene mapping apparatus of an example embodiment.

FIG. 4 illustrates a block diagram of some portions of a scene mapping apparatus 360 of an example embodiment. As shown in FIG. 4, the scene mapping apparatus 360 may include a power unit 420 and processing circuitry 430. In an example embodiment, the power unit 420 may be embodied as a battery or battery pack. However, main power may be applied in some cases. The scene mapping apparatus 360 may be embodied in a mobile or fixed structure with any number of sensor arrays feeding into the scene mapping apparatus 360. In some cases the scene mapping apparatus 360 may be collocated with one or both of the FRISs, or an instance of the scene mapping apparatus 360 could be located remotely from the FRISs and in communication therewith.

The processing circuitry 430 may be configurable to perform actions in accordance with example embodiments described herein. As such, for example, at least some of the functions attributable to the scene mapping apparatus 360 (and/or entities/components thereof) may be carried out by or otherwise instructed by the processing circuitry 430. The processing circuitry 430 may therefore be configured to perform data processing, control function execution and/or other processing and management services according to an example embodiment of the present invention. In some embodiments, the processing circuitry 430 may be embodied as a chip or chip set. In other words, the processing circuitry 430 may comprise one or more physical packages (e.g., chips) including materials, components and/or wires on a structural assembly (e.g., a baseboard).

In an example embodiment, the processing circuitry 430 may include one or more instances of a processor 432 and memory 434 that may be in communication with or otherwise control a filter assembly 450, which may pre-filter and/or post-filter data processed by the FRIS 460, which may also be in communication with the processing circuitry. As such, the processing circuitry 430 may be embodied as a circuit chip (e.g., an integrated circuit chip) configured (e.g., with hardware, software or a combination of hardware and software) to perform operations described herein and such chip may be in communication with the chip of the FRIS 460 on which high speed optical image data processing is performed. However, in some instances, the processing circuitry 430 and the FRIS 460 (with or without the filter assembly 450) could be embodied on a single chip.

In an exemplary embodiment, the memory 434 may include one or more non-transitory memory devices such as, for example, volatile and/or non-volatile memory that may be either fixed or removable. The memory 434 may be configured to store information, data, instructions or the like for enabling the processing circuitry 430 to carry out various functions in accordance with exemplary embodiments of the present invention. For example, the memory 434 could be configured to buffer input data for processing by the processor 432. Additionally or alternatively, the memory 434 could be configured to store instructions for execution by the processor 432. As yet another alternative, the memory 434 may include one or more databases or registers that may store data, images, and/or the like that have been captured in association with the high sampling rate capabilities of the FRIS 460. The image data stored may then be compared by the processing circuitry 430 to determine optical flow, range calculations, time of flight or other useful determinations or calculations associated with example embodiments. In some cases, the data sets may also or alternatively store instructions for generation of maps that reconstruct the environment surrounding the FRIS 460. However, it should be appreciated that the processing of data for map generation could alternatively be performed by a separate computer system receiving raw or processed data from the FRIS 460 in some embodiments.

The processor 432 may be embodied in a number of different ways. For example, the processor 432 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 432 may be configured to execute instructions stored in the memory 434 or otherwise accessible to the processor 432. As such, whether configured by hardware or by a combination of hardware and software, the processor 432 may represent an entity (e.g., physically embodied in circuitry—in the form of processing circuitry 430) capable of performing operations according to embodiments of the present invention while configured accordingly. Thus, for example, when the processor 432 is embodied as an ASIC, FPGA or the like, the processor 432 may be specifically configured hardware for conducting the operations described herein. Alternatively, as another example, when the processor 432 is embodied as an executor of software instructions, the instructions may specifically configure the processor 432 (which could in some cases otherwise be a general purpose processor until configured accordingly) to perform the operations described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A scene measurement assembly comprising:
   a first illuminator assembly comprising multiple grids of coplanar illuminators, each of the multiple grids of coplanar illuminators being disposed in different planes relative to each other;
   a first system-on-chip light sensing device comprising sensors disposed to receive reflected light emitted by the first illuminator assembly;
   a second illuminator assembly comprising plural grids of coplanar illuminators, each of the plural grids of coplanar illuminators being disposed in different planes relative to each other;
   a second system-on-chip light sensing device disposed to receive reflected light emitted by the second illuminator assembly; and
   a scene mapping apparatus configured to receive data from the first and second system-on-chip light sensing devices and generate a three dimensional representation of the scene;
   wherein the first and second system-on-chip light sensing devices each have a sampling rate of greater than 10,000 frames per second relative to performing on-chip image data processing,
   wherein the first and second system-on-chip light sensing devices are each disposed at a scene to be measured at locations having different perspectives of the scene, and
   wherein the first and second system-on-chip light sensing devices are configured to process changes in the reflected light emitted by the first and second illuminator assemblies, respectively, to determine temporal or spatial features of the scene based on optical flow.

2. The scene measurement assembly of claim 1, wherein the first and second illuminator assemblies each transmit coded light emissions.

3. The scene measurement assembly of claim 1, wherein the first and second illuminator assemblies employ time multiplexing to transmit light without interfering with each other.

4. The scene measurement assembly of claim 1, wherein the three dimensional representation is dynamically updated over a series of measurement cycles.

5. The scene measurement assembly of claim 1, wherein the scene measurement assembly generates a static three dimensional measurement of the scene and any change to the static three dimensional measurement triggers an alarm or protective device.

6. The scene measurement assembly of claim 1, wherein the first and second illuminator assemblies are configured to emit light in the visible, infra-red or ultraviolet range.

7. A boundary monitoring system comprising:
   an illuminator assembly configured to generate a structured light boundary not having an object disposed therein; and
   a system-on-chip light sensing device comprising sensors disposed to receive reflected light emitted by the illuminator assembly and reflected off an object introduced into the structured light boundary, the system-on-chip light sensing device being configured to process changes in the structured light boundary indicated in the reflected light to determine a presence of the object based on optical flow,
   wherein the system-on-chip light sensing device has a sampling rate of greater than 10,000 frames per second relative to performing on-chip image data processing.

8. The boundary monitoring system of claim 7, wherein the illuminator assembly is configured to emit coded laser light to prevent interference.

9. The boundary monitoring system of claim 7, wherein the illuminator assembly is configured to emit light in the visible, infra-red or ultraviolet range.

10. The boundary monitoring system of claim 7, wherein the detection of the object in the structured light boundary triggers an alarm or protective device.

11. The boundary monitoring system of claim 7, wherein the system is further configured to detect a shape of the object.

12. A high speed image processing device comprising:

an illuminator assembly configured to generate a structured light pattern; and a system-on-chip light sensing device comprising sensors disposed to receive reflected light emitted by the illuminator assembly, the system-on-chip light sensing device being configured to process changes in the structured light pattern indicated in the reflected light in subsequent image frames to determine speed measurements based on optical flow, wherein the system-on-chip light sensing device has a sampling rate of greater than 10,000 frames per second relative to performing on-chip image data processing.

13. The high speed image processing device of claim 12, wherein the structured light pattern is interleaved, swept or resonantly projected from the illuminator assembly to provide different optical flow characteristics.

14. The high speed image processing device of claim 12, wherein the system-on-chip light sensing device is configured to provide filtering relative to objects moving at different speeds.

15. The high speed image processing device of claim 12, wherein the structured light pattern is injected with different spatial frequencies to enable extraction of background information that correlates at the respective different spatial frequencies.

16. The high speed image processing device of claim 12, wherein the high speed image processing device is configured to operate as an optical correlation velocity log to determine speed data for objects at a given location for a plurality of time and location data points of the objects.

17. The high speed image processing device of claim 12, wherein the illuminator assembly is configured to emit light in the visible, infra-red or ultraviolet range.

18. The high speed image processing device of claim 12, further comprising a first lens focusing light emitted from the illumination assembly and a second lens focusing light onto the sensors of the system-on-chip light sensing device.

19. The high speed image processing device of claim 13, wherein the system-on-chip light sensing device is configured to employ sampling to filter out moving background objects based on the different optical flow characteristics.

* * * * *